PHONOGRAPH TONE ARM CONTROL

Original Filed Oct. 21, 1946

Inventors:
H. Herbert Vanderzee
Robert A. McCallum.
By: Clarence J. Loftus
Atty.

Inventors:
H. Herbert Vanderzee
Robert A. McCallum
By: Clarence J. Loftus
Atty.

United States Patent Office 2,697,608
Patented Dec. 21, 1954

2,697,608

PHONOGRAPH TONE ARM CONTROL

Harry Herbert Vanderzee, Grand Rapids, Mich., and Robert A. McCallum, Clarendon Hills, Ill., assignors, by mesne assignments, to AMI Incorporated, a corporation of Delaware Application January 26, 1951, Serial No. 207,952

6 Claims. (Cl. 274—15)

This invention relates to automatic phonographs, and the present specification is a division of our copending application Ser. No. 704,588, filed October 21, 1946.

In the automatic phonograph art, it is customary to provide a magazine for a plurality of phonograph records, with a selector and transfer mechanism so arranged as to select any one of the records of the magazine and place it in playing position on the turntable. The tone arm is then automatically positioned on the record to begin the playing cycle. When the play is completed, the tone arm is lifted from the record and swung outwardly to a position well beyond the marginal edge of the record and clear of the turntable, so that the transfer mechanism may remove the record and replace it with another selection.

It is desirable in machines of this general type to provide the tone arm with operating means so designed as to place the arm on the record with a considerable degree of precision, so that the playing stylus will immediately engage the first groove of a record and will thereafter be carried across the record surface by the spiral groove. To permit free movement of the arm, it is desirable that the arm shall be freely pivoted and unrestrained as the playing of the record progresses, so that it may follow the groove faithfully.

The present applicants have learned, however, that there are certain shortcomings in the tone arm control mechanisms of the prior art which preclude satisfactory operation under certain conditions of operation. For one thing, it has been learned that while freedom of the movement of the arm in traversing the record is essential, yet this freedom of movement may result in erratic performance if the mounting of the machine is not exactly level, since it unbalances the arm and permits gravity to impart unwanted swinging motion to it. Obviously, this may cause the tone arm to swing inwardly prior to engagement with the record in such a manner as to place the stylus of the tone arm on the record at a point other than the proper starting groove, or even to drag the stylus laterally across the grooves in such a manner as to scratch the record and damage the stylus. Nevertheless, it has heretofore been deemed impossible to restrain the tone arm against inward movement at the moment the stylus engages the record groove without bringing about other operating difficulties, since any positive restraint on the arm would prevent the stylus from following the spiral track of the groove and would cause the stylus to jump from one groove to the next, resulting in serious damage to the record, the stylus, or both.

It is, therefore, the primary object of the present invention to provide a tone arm control assembly including means to stabilize the arm at the moment the stylus contacts the record in such a manner that the stylus is not free for uncontrolled swinging in response to external forces, yet can follow the spiral groove of the record. More specifically, it is one of the objects of the invention to provide a tone arm control which is effective to automatically lift a phonograph tone arm, move it inwardly over the edge of a record, and lower it at the precise position of the first record groove, wherein the several coacting parts are so related to each other as to provide a positive means for holding the tone arm clear of the turntable as the record is placed thereon or removed therefrom, and to exert a yielding resilient restraint on the tone arm as the stylus engages the record groove. This restraint is sufficient to permit the stylus and tone arm to follow the spiral groove of the record from the first instant of engagement therewith, yet to prevent unwanted swinging of the arm before its engagement with the record. Thus the tone arm and stylus are stabilized and protected from undesired gravitational influences, even in cases where the mounting of the mechanism is not entirely level.

It is a further object of the invention to provide a tone arm control mechanism having the functional characteristics outlined above, wherein all of the desired functions are accomplished by a single compound cam having a plurality of coacting cam surfaces to control the several functions of the tone arm.

A still further object of the invention is the provision of a tone arm stabilizing and control device wherein the tone arm is restrained against movement in either direction at the instant the stylus engages the record, but in which the arm is positively restrained against outward movement and is restrained against inward movement by a comparatively light, yieldable spring, so that the stylus of the arm may follow the first few grooves of the record without compressing the spring sufficiently to interfere with the proper tracking of the stylus in the groove.

A still further object of the invention is to provide a tone arm control mechanism as indicated above, wherein the entire mechanism is capable of accomplishing the functions rapidly and with a high degree of precision, yet wherein the individual parts of the tone arm mounting and control assembly are relatively rugged and sturdy, so that the entire mechanism is well suited to automatic phonograph installations in which the mechanisms are often subjected to considerable rough treatment and abuse.

A preferred embodiment of the teachings of this invention is illustrated in the drawings herein, in which:

Figure 1 is a fragmental plan view of a phonograph turntable record transfer mechanism and tone arm as employed herein. The complete phonograph is more fully illustrated in the parent case Ser. No. 704,588, of which this specification is a division.

Figures 1, 2, 3, 4:
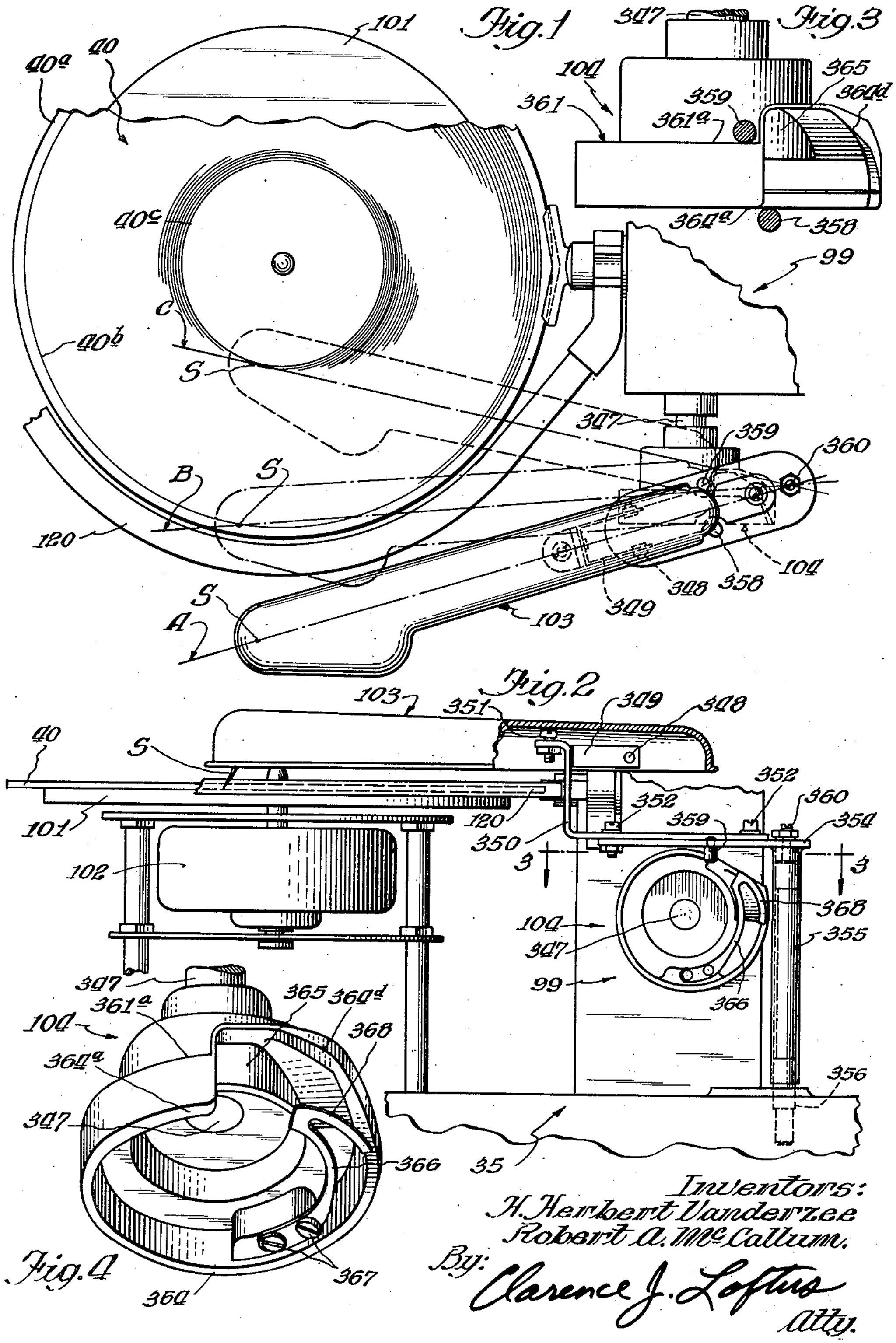
Figure 2 is an elevational view of the mechanism illustrated in Figure 1, with parts of the tone arm broken away to show the pivotal support thereof.
Figure 3 is a detail plan sectional view taken substantially on the plane of the line 3—3 of Figure 2, and showing the configuration of the compound control cam employed herein.
Figure 4 is a perspective view of this cam.
Figures 5, 6, 7, 8, 9, 10:
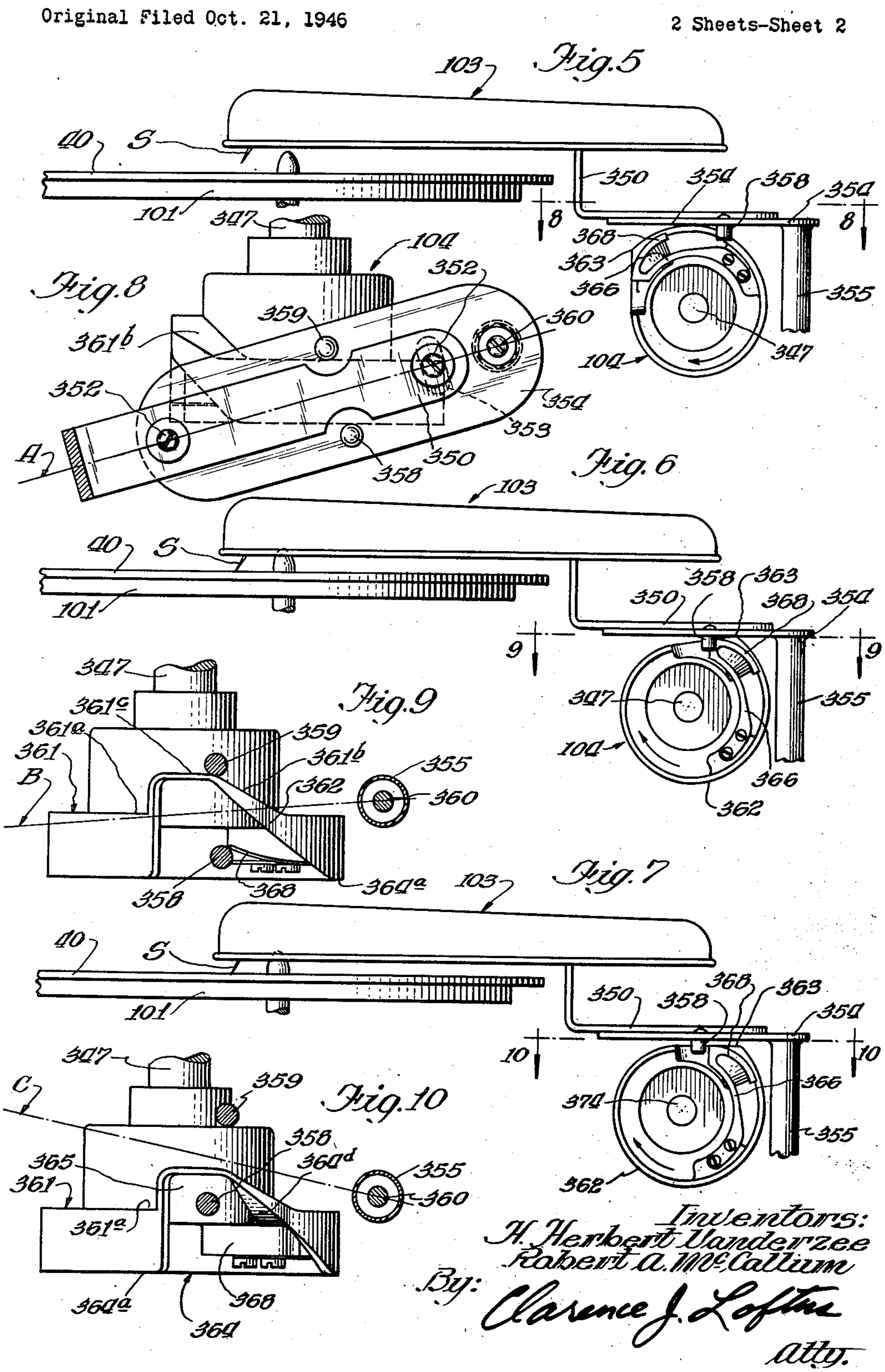

Figures 5, 6 and 7 are fragmental views similar to Figure 2 but showing the several parts of the mechanism in the positions they assume at various phases of the operation of the device; and Figures 8, 9 and 10 are plan sectional views taken on the planes of the line 8—8 of Figure 5, 9—9 of Figure 6, and 10—10 of Figure 7, showing the relative positions which the control cam assumes during each of the several stages of operation of the mechanism.

As more fully disclosed in the aforementioned application Ser. No. 704,588, the entire phonograph mechanism is mounted on a base plate 35 (Figure 2) so that the transfer mechanism generally designated as 99 may swing the transfer arm 120 to take a record 40 from a magazine (not shown) and to deposit the record in playing position on a turntable 101. The turntable 101 is driven by a motor 102 suitably mounted on the base 35, and a tone arm 103 is swingably mounted on the base and arranged to be placed on the record surface by a control cam generally designated as 104. The control cam 104 is carried on a projecting end of a shaft 347 which forms a part of the record transfer mechanism 99 and projects outwardly therefrom. The details of the record transfer mechanism will not be described in this specification, it being deemed sufficient to point out that this mechanism is such that in the normal cycle of operation of the phonograph, the shaft 347 is oscillated back and forth through an arc which is almost, but not quite, a complete revolution. That is, the shaft 347 and cam 104 (which are shown in their position of rest in Figure 2) move in a clockwise direction for about 340°, immediately after the record has been placed on the turntable. This motion causes the tone arm 103 to be lifted and placed on the turntable with the stylus S in the first record groove 40*b* of the record. After playing is completed, the shaft 347 and cam 104 move in a counterclockwise direction, returning the cam to its original position. This movement causes the cam to lift the tone arm and stylus from the record and swing it outwardly beyond the outer marginal edge 40*a* thereof (Figure 1).

The tone arm 103 is mounted on an adjustable bracket 350 carried by a control arm 354 which is in turn supported on a pivotal sleeve 355 carried on a stud 356 fixed in the machine base 35, so that the entire arm assembly may be pivoted toward or away from the record and lifted from or placed on the record as required. All of these functions are performed by the cam 104. The tone arm 103 is mounted on a pair of pivot pins 348 which extend outwardly from the opposite arms of a U-shaped supporting bracket 349, which is in turn secured to a vertical portion of the adjustable mounting bracket 350 (Figure 2). The downward piovtal movement of the tone arm 103 on the bracket is limited by a stop screw 351. The bracket 350 is secured to the control arm 354 by a pair of screws 352. One of these screws extends through an elongated slot 353 in the bracket 350 (Figure 8), so that the position of the bracket 350 on the arm 354 may be adjusted to place the stylus S on the first record groove with exact precision.

The arm 354 is permanently affixed to the upper end of the vertical pivot sleeve 355, which is rotatable on the fixed stud 356 and vertically shiftable with respect thereto. The lower end of the stud 356 is rigidly secured in the base 35 of the machine. The sleeve 355 is thus free to pivot on the stud to permit swinging movement of the tone arm, and the tube may slide vertically on the stud as required as the tone arm is lifted from the record surface or replaced thereon. A screw 360 extends through the arm 354 and engages the upper end of the stud 356 to limit the downward movement of the tone arm assembly.

The lower face of the control arm 354 is positioned immediately above the cam 104 so that the outer peripheral surface 362 of the cam will directly engage the arm to raise or lower the tone arm as required. The lower face of the arm 354 is provided with a pair of cam follower pins 358 and 359, which are spaced apart from each other to engage the inner cam surface 361 and the outer cam surface 364 respectively, to control the swinging movements of the tone arm.

The general mode of operation of the tone arm is best described in connection with Figure 1, wherein the full line, broken line and dotted line views of the tone arm 103 indicate the three principal positions through which this arm passes during its cycle of operations. In operation, the tone arm 103 swings from an outermost position wherein it lies on the center line A through a starting position wherein it lies along the center line B, and thence to an innermost position along the center line C.

Broadly stated, it is the function of the cam 104 to hold the arm 103 in its full line position, where it is well clear of the turntable, as the record 40 is placed in position by the transfer arm 120. The cam then swings the tone arm inwardly, placing the stylus S on the record at the precise location of the outermost record groove 40*b*, but restraining the arm positively from outward displacement and exerting light yielding restraint on the arm in such a manner as to prevent it from being accidentally swung inwardly by inertia, vibration or gravitational influences, but to permit the stylus to follow the spiral groove of the record from the instant of engagement. The arm is then left free to traverse the record until it reaches a position on the line C, with the stylus S in the innermost groove 40*c* of the record. At this point an automatically actuated switch (not shown) causes the cam 104 to return to its original position, lifting the tone arm from the record and moving it positively outwardly until it lies on the center line A. In this position the tone arm is at rest and is spaced substantially away from the marginal edge 40*a* of the record, so as to provide adequate clearance for movement of the transfer arm 120 in lifting the record from the turntable and replacing it with another record on which a different selection is recorded.

The several successive steps of operation of the tone arm are illustrated in Figures 2, 5, 6 and 7 respectively, with the corresponding positions of the control cam shown in Figures 3, 8, 9 and 10. In Figure 2 the cam 104 is in the position of rest which it occupies when the tone arm lies on the center line A and is spaced from the record. At this time the downward sliding movement of the pivot sleeve 355 is limited by engagement of the stop screw 360 with the upper end of the fixed pivot stud 356, and while the point of the stylus S may lie slightly below the uppermost surface of a record 40 on the turntable, the downward motion of the stylus is limited by the stop screw 351 on the bracket 350. This stop screw engages the underside of the tone arm and limits the movement of the arm 103 on the pivots 348. When in this position the tone arm is positively restrained against swinging movement in either direction. The outer follower pin 358 (Figure 3) engages the outer flat surface 364*a* to prevent inward swinging of the arm, while the innermost follower pin 359 engages the inner flat face 361*a* of the cam to limit outward swinging of the tone arm.

Rotation of the cam 104 through an arc of substantially 340° in a clockwise direction lifts the tone arm above the surface of the record, swings it inwardly until it lies on the center line B as illustrated in broken lines in Figure 1, and lowers the arm gently to bring the stylus S into engagement with the record at the precise location of the first record groove 40*b*. The first portion of this movement of cam 104 lifts the tone arm and stylus above the surface of a record on the turntable, as shown in Figures 5 and 8. As seen in Figure 5, the outer peripheral surface 362 of the cam 104 engages the underside of the control arm 354, and as the high point 363 of this cam approaches the arm 354 it lifts the stylus S above the surface of the record 40. The position of the follower pins 358 and 359 is not immediately changed, however, and the tone arm therefore continues to occupy a position on the center line A until the stylus is lifted above the record surface.

The parts then move to the positions of Figures 6 and 9, wherein the tone arm has been swung inwardly to a position on the center line B, and the stylus S has been lowered into engagement with the first groove 40*b* of the record. The tone arm is moved inwardly by the operation of the innermost cam follower pin 359, which rides inwardly along the inclined cam surface 361*b* and onto the dwell portion 361*c* of the cam. As this occurs, the outer cam follower pin 358 leaves the surface 364*a* and overrides the return bend portion 368 of a leaf spring 366, which is mounted on the cam 104 by a pair of machine screws 367. Concurrently with this inward movement, the high point 363 on the peripheral surface 362 of the cam 104 passes under the point of contact with the control arm 354 and lowers the tone arm assembly to bring the stylus S into contact with the uppermost surface of the record.

It will be understood, of course, that the control arm 354 is lowered sufficiently to provide slight clearance above the limit screw 351 so that the tone arm may have some pivotal movement on the pivots 348. The several portions of the cam surfaces and their followers are so related that the stylus is placed in the first groove of a record with a considerable degree of precision, and so that it engages the record just before the follower pin 358 leaves the end of the return bend portion 368 of the leaf spring 366. This action may be adjusted with extreme accuracy by shifting the adjusting bracket 350 slightly with respect to the control arm 354, and securing it in properly adjusted position thereon by the two screws 352.

In the operation of placing the stylus on the record, and in the period prior to actual engagement of the stylus with the record groove, the tone arm is lightly restrained against inward swinging movement by the force exerted by the leaf spring 366. This restraint is not so positive, however, as to prevent the tone arm from following the record groove from the very instant of engagement. As soon as the stylus begins to track in the record groove the restraint on the arm is wholly removed by the continued rotation of the cam 104 from the position just described to the positions of Figures 7 and 10. This is the position which the cam occupies as the record is played, and as will be seen from the location of parts in the figure, the inward movement of the tone arm as it traverses the record from the outermost groove 40*b* to the innermost groove 40*c* will carry the tone arm from the center line B to the center line C, and will cause the inner cam follower 359 to move clear of the cam surfaces 361*b* and 361*c*. As this occurs, the outer cam follower pin 358 will move into the offset portion 365, but will stand clear of all contact with the cam until the playing of the record is completed.

When the tone arm reaches the center line C, an automatic limit switch and motor (not shown) return the cam 104 to its original position by rotation in a counterclockwise direction as viewed in these drawings. The first action of the cam occurs when the high point 363 of the peripheral cam surface 362 engages the underside of the control arm 354 and lifts the stylus S from the record surface. Continued rotation of the cam will cause the inclined portion 364*d* of the outer cam surface 364 to engage the follower pin 358 and swing the tone arm outwardly from a position on the center line C to a position on the center line A. During this operation, the pin 358 rides under the free end of the return bend portion 368 of the leaf spring 366, and the parts return to their original positions wherein they are ready for the next subsequent operation.

From the above it will be seen that while the tone arm control mechanism shown here stabilizes the movement of the tone arm sufficiently to prevent uncontrolled swinging of the arm as it engages the record, yet the restraint applied to the arm is nevertheless sufficiently yielding so that the arm may follow the spiral of the record groove at the instant of contact therewith.

These objects are accomplished, moreover, by a structure which is simple in construction and consists of a relatively few parts, each having the inherent ruggedness and strength to withstand long continued usage. It follows that by the present teaching it is feasible to overcome some of the principal defects in mechanisms heretofore designed for this purpose, yet to do so with a simple, reliable, and comparatively inexpensive mechanism.

Having thus described our invention, what we claim as new and desire to secure by United States Letters Patent is:

1. In a phonograph having a turntable and a tone arm carrying a playing stylus engageable with a record on the turntable, the combination of a tone arm mounting and control assembly consisting of a pivotal support constructed and arranged to swing in a plane parallel to the surface of a record on the turntable, and a cam follower member carried by said support with an adjustable bracket on said cam follower carrying the said tone arm; a compound tone arm positioning cam constructed and arranged to move said follower; said cam having one surface contacting said follower to raise the tone arm with respect to the record and lower it thereon, with another cam surface coacting therewith to swing the tone arm inwardly over the edge of the record to the first groove thereof, and a resilient spring coacting with said cam and engaging the follower while the tone arm is placed in the first groove of the record to provide light resilient restraint against free inward movement of the tone arm until the stylus thereof is seated in the record groove.

2. In an automatic phonograph, a power actuated tone arm positioning and control mechanism comprising, in combination, a vertical pivot stud having its lower end fixedly secured to the phonograph frame, a relatively long slender pivot tube in telescoping relation with said stud and adapted for pivotal and vertical sliding movement with respect thereto; a cam follower plate secured to the upper end of said pivot tube and projecting in an outward horizontal direction therefrom; a rotatable control cam disposed immediately below said cam follower plate and adapted to engage the under side thereof to intermittently elevate said plate; and an adjustable screw extending through the cam follower plate to bear against the upper end of the aforementioned pivot stud to effect precise vertical adjustment of the cam follower plate with respect to the rotatable cam thereunder: a tone arm bracket disposed on the upper side of the cam follower plate and adjustably secured thereto, with an upright support portion of said bracket carrying a tone arm pivoted thereon, with an adjustable stop screw to engage the tone arm and limit its downward pivotal movement; together with a pair of cam follower pins fixedly spaced apart from each other and projecting downwardly from the underside of the cam follower plate and disposed on opposite sides of the rotatable control cam; said pins being adapted to alternatively engage two opposite cam surfaces on said control cam to swing said tone arm into a series of predetermined positions in timed sequence with the raising and lowering of said tone arm by engagement of said cam with the under side of the cam follower plate.

3. In an automatic phonograph, a power actuated tone arm positioning and control mechanism comprising, in combination, a pivoted cam follower plate projecting in an outward horizontal direction; a rotatable control cam disposed immediately below said cam follower plate and adapted to engage the under side thereof to intermittently elevate said plate; a tone arm bracket disposed on the upper side of the cam follower plate and adjustably secured thereto, with an upright support portion of said bracket carrying a tone arm pivoted thereon; together with a pair of cam follower pins fixedly spaced apart from each other and projecting downwardly from the under side of the cam follower plate and disposed on opposite sides of the rotatable control cam; said pins being adapted to alternatively engage two opposite cam surfaces on said control cam to swing said tone arm into a series of predetermined positions in timed sequence with the raising and lowering of said tone arm by engagement of said cam with the under side of the cam follower plate.

4. In an automatic phonograph, a power actuated tone arm positioning and control mechanism comprising, in combination, a vertical pivot stud having its lower end fixedly secured to the phonograph frame, a relatively long slender pivot tube in telescoping relation with said stud and adapted for pivotal and vertical sliding movement with respect thereto; a cam follower plate secured to the upper end of said pivot tube and projecting in an outward horizontal direction therefrom; a rotatable control cam disposed immediately below said cam follower plate and comprising plural cam surfaces adapted to swing said follower plate between a plurality of angular positions and to engage the under side thereof to intermittently elevate said plate; and an adjustable screw extending through the cam follower plate to bear against the upper end of the aforementioned pivot stud to effect precise vertical adjustment of the cam follower plate with respect to the rotatable cam thereunder: a tone arm bracket disposed on the upper side of the cam follower plate and adjustably secured thereto, with an upright support portion of said bracket carrying a tone arm pivoted thereon, with an adjustable stop screw adapted to engage the tone arm and limit its downward pivotal movement.

5. In an automatic phonograph having a power actuated tone arm, a positioning and control mechanism comprising, in combination, a control cam consisting of a single rotatable wheel having one cam surface around its peripheral edge and a pair of additional coacting cam surfaces on its front and back faces respectively, with a single cam follower plate mounted for movement in at least two planes, with said plate adapted to be engaged by the peripheral edge of said wheel; a pair of cam follower pins fixedly spaced apart from each other and mounted on said plate, and disposed on opposite sides of the peripheral edge of the control cam; said cam pins being adapted to alternatively engage the separate opposed cam surfaces on the front and back faces thereof; with mechanical connections between the follower plate and the tone arm to swing said tone arm into predetermined angular positions by operation of said pins in timed sequence with the raising and lowering of said tone arm by engagement of said cam with the cam follower plate.

6. In an automatic phonograph having a power actuated tone arm, a positioning and control mechanism comprising, in combination, a control cam consisting of a single rotatable wheel having one cam surface around its peripheral edge and a pair of additional coacting cam surfaces on its front and back faces respectively, with one of said cam surfaces including a spring section therein; a single cam follower plate mounted for movement in at least two planes, with said plate adapted to be engaged by the peripheral edge of said wheel; a pair of cam follower pins fixedly spaced apart from each other and mounted on said plate, and disposed on opposite sides of the peripheral edge of the control cam; said cam pins being adapted to alternatively engage the separate opposed cam surfaces on the front and back faces thereof, with one of said pins being adapted to engage the spring section of the aforementioned cam; with mechanical connections between the follower plate and the tone arm to swing said tone arm into predetermined angular positions by operation of said pins in timed sequence with the raising and lowering of said tone arm by engagement of said cam with the cam follower plate.

References Cited in the file of this patent

UNITED STATES PATENTS

| Number | Name | Date |
|---|---|---|
| 2,216,029 | Wright | Sept. 24, 1940 |
| 2,309,352 | Offen | Jan. 26, 1943 |
| 2,352,331 | Leline | June 27, 1944 |
| 2,370,875 | Pressley | Mar. 6, 1945 |
| 2,424,132 | Alexandersson | July 15, 1947 |
| 2,563,653 | Lingenbrink | Aug. 7, 1951 |

FOREIGN PATENTS

| Number | Country | Date |
|---|---|---|
| 617,883 | Great Britain | Feb. 14, 1949 |